United States Patent
Hartmann

(10) Patent No.: US 7,686,317 B2
(45) Date of Patent: Mar. 30, 2010

(54) ELLIPTICYCLE WITH TORQUE AMPLIFYING PEDAL BEAMS AND A FULLY ENCLOSED MULTIPLE SPEED DUAL REAR WHEEL DRIVE

(76) Inventor: Dirck Ten Broeck Hartmann, 4121 Morning Star Dr., Huntington Beach, CA (US) 92649

( * ) Notice: Subject to any disclaimer, the term of this patent is extended or adjusted under 35 U.S.C. 154(b) by 351 days.

(21) Appl. No.: 12/229,101

(22) Filed: Aug. 6, 2007

(65) Prior Publication Data

US 2009/0039613 A1   Feb. 12, 2009

(51) Int. Cl.
*B62M 1/04* (2006.01)
(52) U.S. Cl. .................. 280/256; 280/221
(58) Field of Classification Search ............ 280/221, 280/252, 253, 256
See application file for complete search history.

(56) References Cited

U.S. PATENT DOCUMENTS

| | | | | |
|---|---|---|---|---|
| 5,520,401 | A * | 5/1996 | Mohseni | 280/221 |
| 6,439,590 | B1 * | 8/2002 | Liang | 280/221 |
| 6,557,880 | B2 * | 5/2003 | Drew | 280/259 |
| 6,659,486 | B2 * | 12/2003 | Eschenbach | 280/221 |
| 6,715,779 | B2 * | 4/2004 | Eschenbach | 280/221 |
| 6,716,141 | B2 * | 4/2004 | Bhoopathy | 482/51 |
| 6,764,088 | B2 * | 7/2004 | Hung | 280/221 |
| 7,111,860 | B1 * | 9/2006 | Grimaldos | 280/253 |
| 7,293,789 | B1 * | 11/2007 | Efros | 280/251 |
| 2002/0130484 | A1 * | 9/2002 | Fa-Kuang | 280/281.1 |
| 2003/0025293 | A1 * | 2/2003 | Drew | 280/253 |
| 2003/0193158 | A1 * | 10/2003 | Hung | 280/221 |
| 2006/0103105 | A1 * | 5/2006 | Fan | 280/221 |

* cited by examiner

*Primary Examiner*—Lesley Morris
*Assistant Examiner*—Michael R Stabley

(57) ABSTRACT

An Ellipticycle features a conventional bicycle front wheel assembly which is joined by two parallel lengths of bicycle tubing to a cast aluminum gear case within which a multiple speed transmission is enclosed. A crank shaft extends out through bearings in the left and right side halves of the gear case at its forward end with a crank arm fixed on each end of the crank shaft. A pedal beam is rotatably mounted near its center on a spindle fixed in the end each crank arm. A cam roller bolted on each side of the gear case at its aft end engages a short length of steel angle riveted on the inside of each pedal beam providing a downward force to counter balance the weight of the rider on the cantilevered forward portion of the pedal beam. A length of aluminum tubing is bolted on each side of the gear case at its aft end and encloses a drive shaft which passes out through bearings in the gear case. Power is delivered from the crank shaft to the transmission by a conventional bicycle chain coupling a large sprocket fixed on the crank shaft with a smaller sprocket fixed with multiple spur gears on a parallel shaft rotatably mounted in the gear case. A one way clutch is mounted on the outboard end of the drive shaft on each side between a pair of ball bearings inside the aluminum tube. Each rear wheel is fixed on an integral extension of the one way clutch on that side which drives the wheel yet permits differential rear wheel speeds on turns.

4 Claims, 5 Drawing Sheets

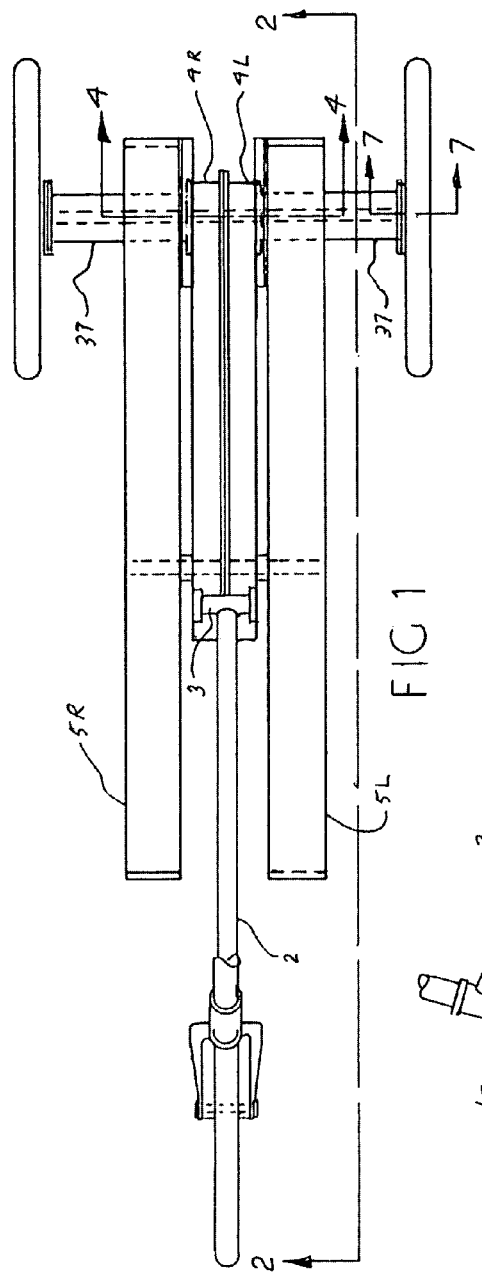
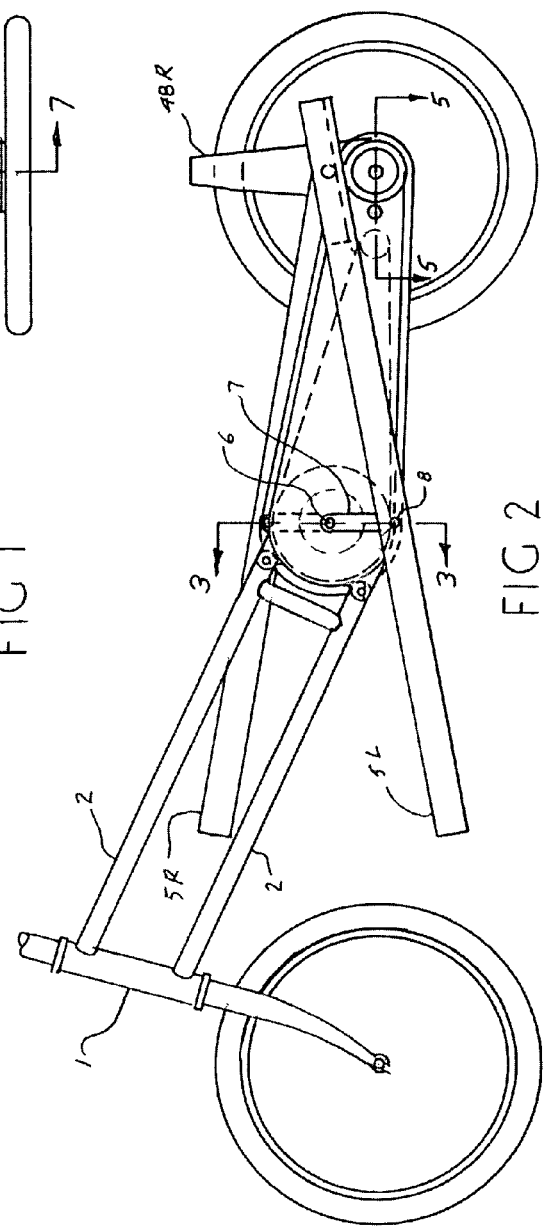

ELLIPTICYCLE WITH TORQUE AMPLIFYING PEDAL BEAMS AND A FULLY ENCLOSED MULTIPLE SPEED DUAL REAR WHEEL DRIVE

BACKGROUND OF THE INVENTION

Field of the Invention

This invention relates generally to pedal powered vehicles for transportation, cardiovascular conditioning, and recreation and particularly to frame configurations which permit the rider to remain erect and simulating a running motion. In urban areas it provides the enjoyment and conditioning of running without the wear and tear on joints and muscles from repeated long distance runs on paved surfaces.

SUMMARY OF THE INVENTION

The dual rear wheel driven ellipticycle according to the present invention couples the head tube, front fork and front wheel of a conventional bicycle with a cast aluminum gear case. Two parallel lengths of bicycle tubing are welded to the head tube at their forward ends and to two short transverse lengths of tubing at their aft ends which fit between integrally cast ears on the gear case. A pair of through bolts clamp the transverse tubing between the integrally cast ears joining the front wheel assembly with the gear case. The gear case is cast in two halves with an integrally cast flange around the perimeter of each half in a plane on the gear case centerline. An "O" ring seal in the flange on one half prevents oil leakage from the gear case when the two halves are bolted together.

A crank shaft extends out through ball bearings in the side walls of the gear case at its forward end. A crank arm is rigidly fastened on each end of the crank shaft with a crank pin press fit in the end of each crank arm. An extruded aluminum pedal beam is rotatably mounted near its center on each crank pin. A large diameter sprocket is rigidly fastened on the crank shaft near the inside wall of the right side half of the gear case at its forward end. A gear shaft and a counter shaft are mounted parallel to the crank shaft on bearings in the side walls of the gear case near its aft end. A small diameter sprocket is threaded with right hand threads on the hub of the end gear of a four gear cluster on the gear shaft. A conventional bicycle chain couples the sprocket on the crank shaft with the sprocket on the gear shaft. Two pins held captive by the sprocket threaded on the hub of the end gear of the four gear cluster pass through all four gears and forces the cluster to rotate at the speed of the small sprocket.

Each of four gears on the counter shaft is in constant mesh with one of the gears on the gear shaft. All of the gears have a ½ inch face width. The four gears on the counter shaft have internal teeth that extend half way through the bore. The counter shaft has two 3/16 inch wide by 1½ inch long orthogonally located slots that pass all the way through the shaft. A ¼ inch wide by 3/16 thick steel bar with a tooth form on each end to match the internal teeth in the bores of the counter shaft gears extends out through each of the orthogonal slots. The bars are notched half way through their width at their center so when the orthogonal bars are nested together they are in the same plane. A shift rod located on the centerline of the counter shaft has a 3/32 inch diameter spindle on its end which passes through a hole at the center of the orthogonal bars which rotate freely on the spindle but are axially constrained by the shift rod.

Each of the four gears on the counter shaft rotates freely relative to the counter shaft except when the orthogonal bars engage its internal teeth forcing the counter shaft to rotate at the speed of the selected gear. The width of the orthogonal bars is slightly less than the width of bore without internal teeth so it is impossible to engage adjacent gears simultaneously. ½ inch of axial movement of the shift rod is required for each gear change, or 1½ inches of axial travel to shift from first to fourth speed.

The shift rod on the centerline of the counter shaft extends out through the side wall of the gear case where it engages a commercially available push/pull wire, like those commonly used on boats. The wire passes through a guide fitting bolted on the outside of the gear case. The guide fitting clamps and holds fixed the end of the plastic sleeve within which the push/pull wire slides.

A fifth gear is installed on the end of the counter shaft with left handed threads and always rotates at the speed of the counter shaft. This fifth gear is in constant mesh with a gear installed with left handed threads on a drive fitting mounted parallel to the counter shaft on ball bearings in the side walls of the gear case. A tubular steel drive shaft fits inside each end of the drive fitting and is driven by a torque transfer pin installed in a transverse hole through both drive fitting and drive shaft and retained by the inner race of the ball bearing supporting that end of the drive fitting.

A drive shaft housing, comprised of a length of extruded aluminum tubing to which a machined aluminum ring is welded at both ends, is bolted on each side of the gear case concentric with the drive shaft. An "O" ring seals the joint at each end of the drive shaft housing.

A clutch ring is located near the outboard end of the drive shaft on each side. Torque is transmitted from the drive shaft to the clutch ring by a torque transfer pin which is retained by the inner race of a ball bearing centering the clutch ring in a ratchet fitting. Two clutch dogs are mounted on diametrically opposed pins which pass through the sides of a "U" shaped channel in the clutch ring. The pins are retained by a washer located between the ball bearing and the inner side of the channel. A hairpin spring forces each clutch dog out into engagement with the ratchet fitting.

A cylindrical extension on the ratchet fitting extends out through a ball bearing captive in a closing plate bolted to the machined ring on the end of the drive shaft housing. The closing plate on each side extends upward to a point above the rear wheel and provides a mounting surface for a conventional side pull brake caliper, which is used on all three wheels.

A stud is press fit in the outboard end of the ratchet fitting on its centerline, and two pins are press fit near the perimeter of the extension. A hub of the rear wheel fits over the cylindrical extension and is clamped with a nut threaded on the press fit stud. Torque is transmitted to the wheel by the two pins press fit in the outboard end of the ratchet fitting.

A stud type track roller is bolted to the gear case directly over the drive shaft housing on each side. The track roller engages a length of steel angle riveted on the inside of the extruded aluminum pedal beam near its aft end and provides the downward force required to balance load placed on the forward cantilevered portion of the pedal beam, while permitting the axial travel dictated by the length of the crank arm. An angle clip bolted directly under the track roller with clearance for the steel angle limits the downward travel of the aft end of the beam when there is no load on the forward portion of the pedal beam.

BRIEF DESCRIPTION OF THE DRAWINGS

FIG. 1 is a plan view of the present invention.

FIG. 2 is a sectional view taken along the line 2-2 of FIG. 1

DESCRIPTION OF THE PREFERRED EMBODIMENT

Referring to FIGS. 1 and 2, the Ellipticycle in accordance with the present invention includes the front wheel and fork assembly of a conventional bicycle. Conventional bicycle tubing 2 is welded at its forward end to the head tube of the front fork assembly 1, and at its aft end to a short transverse length of tubing 3 which fits between integrally cast ears on the left side 4L and right side 4R halves of a cast aluminum gear case.

Figure 3:
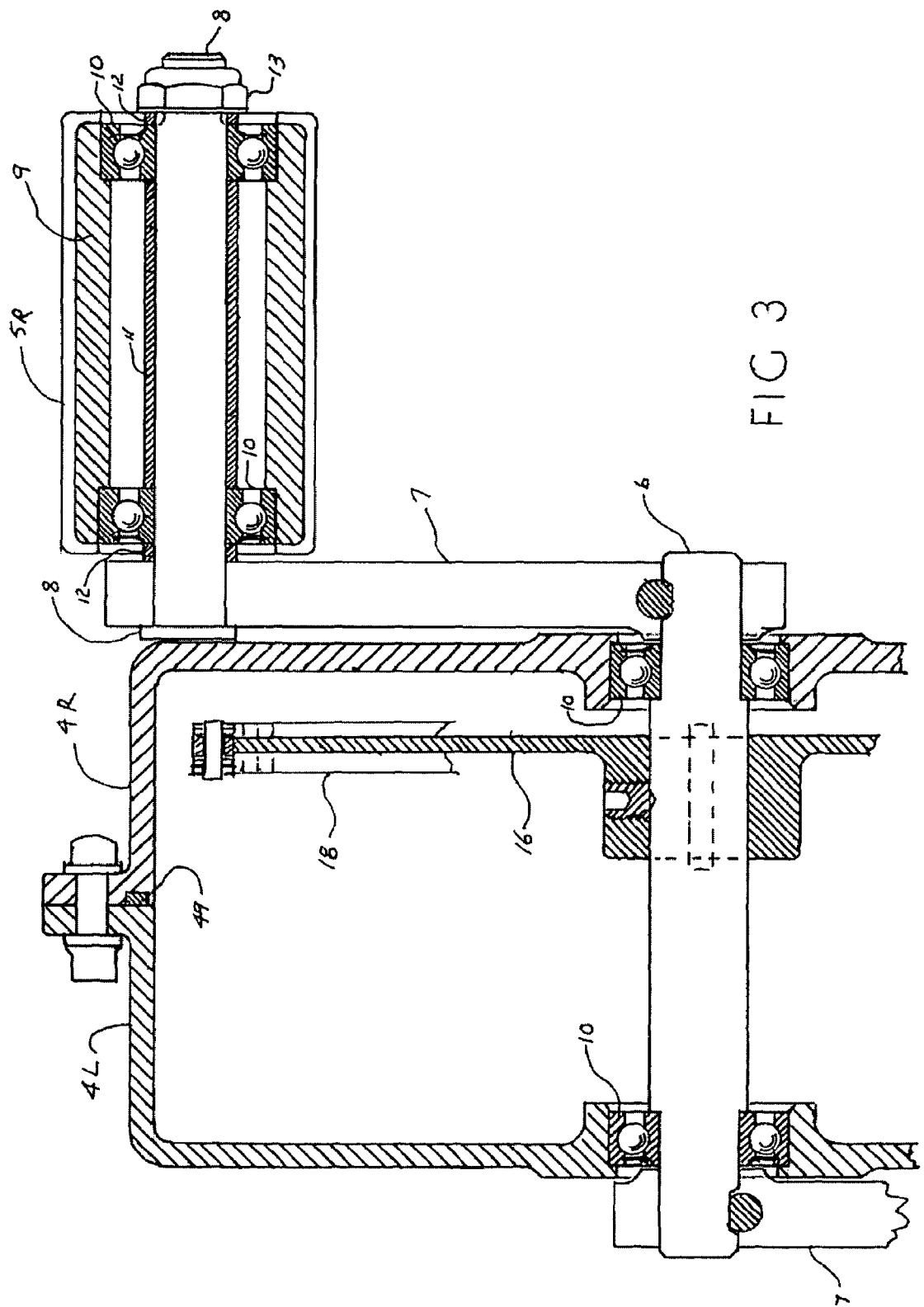
FIG. 3 is a sectional view taken along the line 3-3 of FIG. 2

Referring to FIG. 3, a crank shaft 6 is supported at each end by a ball bearing 10 pressed into the left and right side halves 4L and 4R of the gear case. A crank arm 7 is rigidly fastened on each end of the crank shaft 6. A steel spindle 8 is press fit in the end of each crank arm 7. A machined aluminum block 9 is pushed into each pedal beam 5L and 5R on assembly of the beam, and riveted in position with rivets through the side walls of the pedal beam just forward and aft of the holes bored for the bearings 10. When installing the assembled pedal beam on the spindle 8 the inner spacer 12 slides on first; then the spacer 11; then the outer bearing 10; then the outer spacer 12; and finally the nut 13 which clamps the pedal beam assembly firmly against the crank arm 7.

Figure 4:
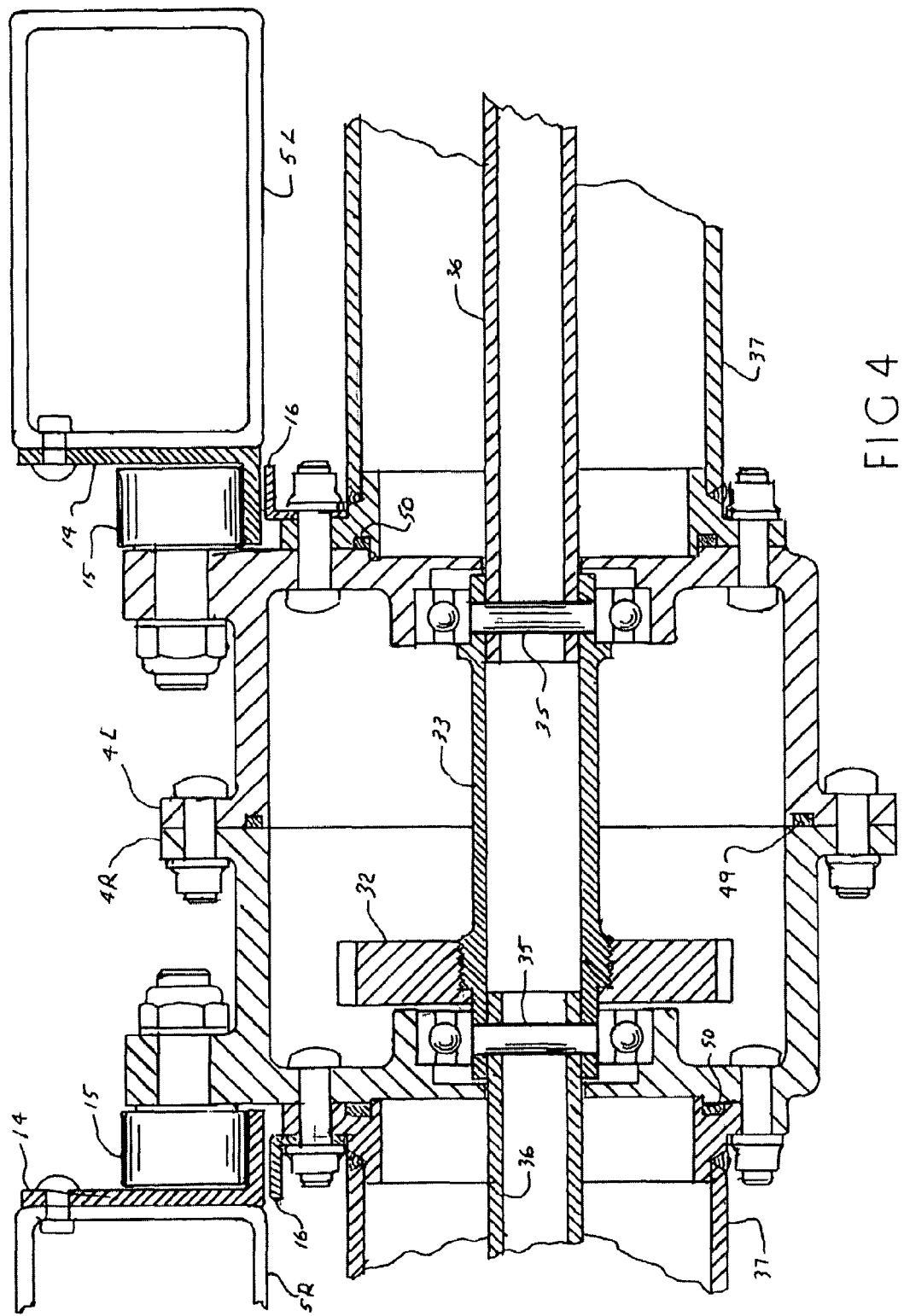
FIG. 4 is a sectional view taken along the line 4-4 of FIG. 1

Referring to FIG. 4, a steel angle 14 is riveted inside the pedal beams 5L and 5R at their aft ends. When a pedal beam is mounted on the spindle 8, the steel angle 14 on that side is positioned under the stud type cam roller 15 which is bolted to the left and right side halves of the gear case 4L and 4R. The angle 16 is bolted to the gear case directly under the cam roller 15 to limit downward travel of the aft end of the pedal beam when the forward portion is unloaded, with enough clearance to permit unimpeded axial travel of the angle 14.

Figure 5:
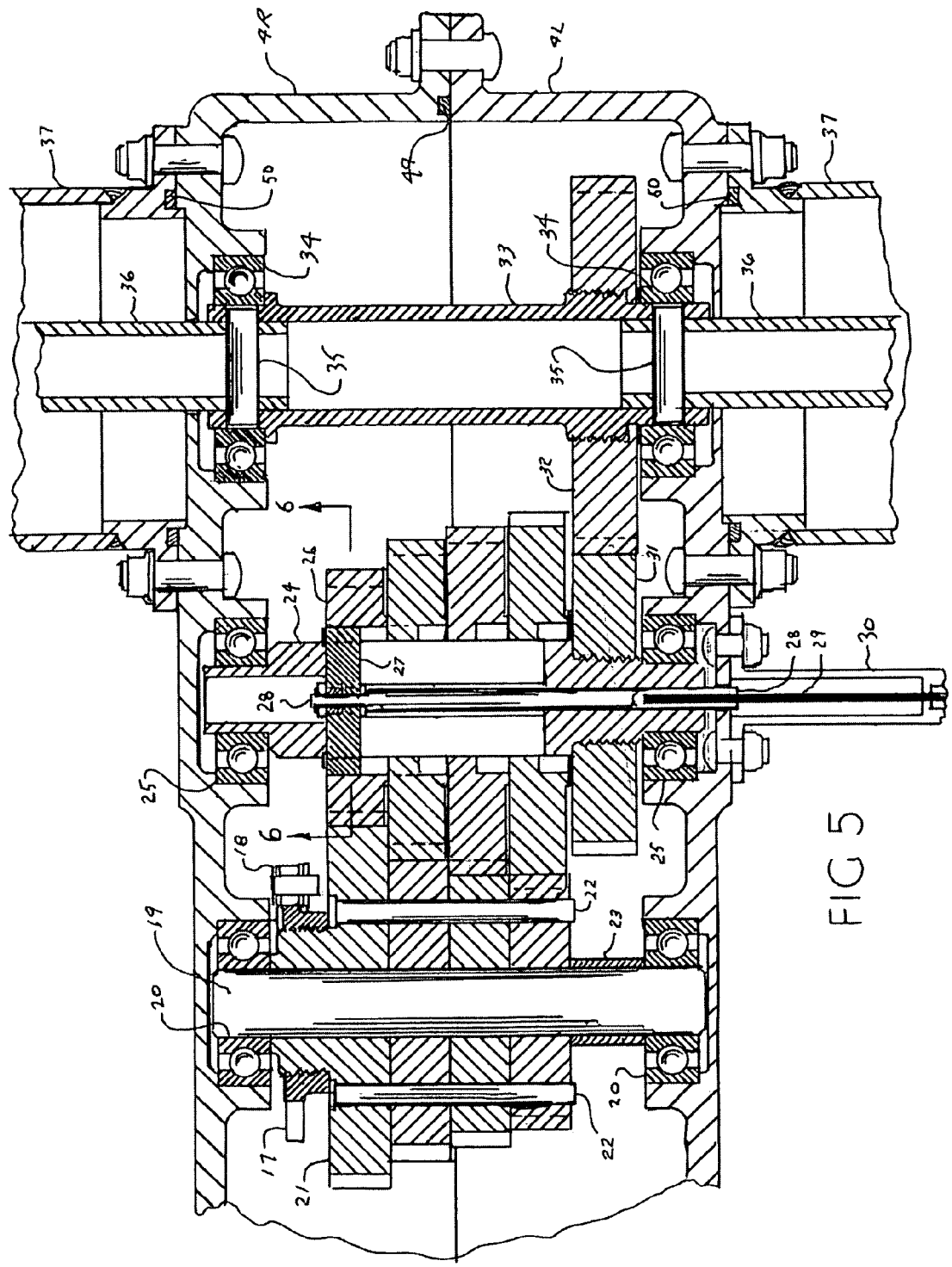
FIG. 5 is a sectional view taken along the line 5-5 of FIG. 2

Referring to FIG. 5, a gear shaft 19 is supported at both ends by ball bearings 20 pressed into the right and left side halves of the gear case 4R and 4L. A cluster of four gears 21 is mounted on the shaft 19. A sprocket 17 is threaded with right hand threads on the hub of the end gear of the four gear cluster 21. A conventional bicycle chain 18 connects the sprocket 17 with the sprocket 16 on the crank shaft 6. The four gears 21 are forced to rotate at the speed of the sprocket 17 by the shear pins 22 which pass through all four gears and are retained by the sprocket 17. The four gear cluster 21 is held in proper position between the inner races of the ball bearings 22 by the spacer 23.

Figures 6, 7, 8:
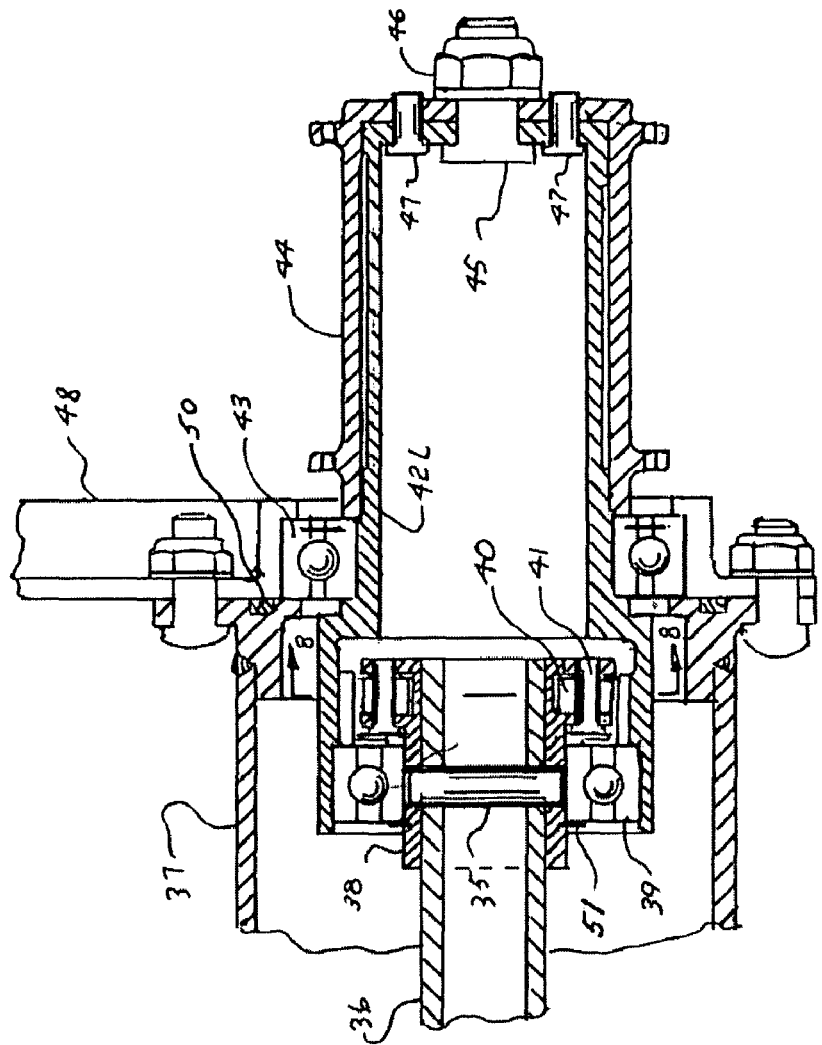
FIG. 6 is a sectional view taken along the line 6-6 of FIG. 5
FIG. 7 is a sectional view taken along the line 7-7 of FIG. 1
FIG. 8 is a sectional view taken along the line 8-8 of FIG. 7

A counter shaft 24 is mounted parallel to the gear shaft 19 on two ball bearings 25 pressed in the right and left side halves of the gear case 4R and 4L. Each of four gears 26 on the counter shaft 24 is in constant mesh with one gear of the four gear cluster 21 on the gear shaft and rotates at a speed dictated by the numbers of teeth on the meshing gears. Referring to FIG. 6 as well as to FIG. 5, twelve equally spaced teeth that extend half way through the bore are cut in each of the four gears 26 on the counter shaft 24 which has two orthogonally located slots cut all the way through it. A steel bar 27 with a tooth form on each end that matches that in the bores of the gears 26, slides in the orthogonally located slots. The steel bar 27 is notched half way through its width at its center so when two orthogonally oriented bars 27 are nested together they are in the same plane.

Still referring to FIGS. 5 and 6, an integral spindle on the end of a shift rod 28 extends through a hole at the center of the steel bars 27. The bars 27 are held captive between a shoulder on the shift rod 28 and a washer on the spindle. The washer is retained by a small snap ring on the end of the spindle. The shift rod controls the axial position of the bars 27 which rotate freely on the spindle. The length of the slots through the counter shaft 24 permits 1½ inches of axial travel of the bars 27, which is the distance required to shift from first to fourth speed. The shift rod 28 extends out through a hole in the side wall of the left side half of the gear case 4L. A push/pull wire 29 is rigidly fixed in the end of the shift rod 28. A shift wire guide 30 is bolted to the side wall of the left side half of the gear case 4L and fixes the end of the plastic sleeve within which the wire 29 slides.

Still referring to FIG. 5, a gear 31 is threaded with left hand threads against a shoulder on the counter shaft 24 and rotates at the speed of the counter shaft. The gear 31 is in constant mesh with a drive shaft gear 32 which is threaded with left hand threads on a drive fitting 33 supported at each end by a ball bearing 34 in the side wall of the gear case halves 4R and 4L. Torque is carried from the drive fitting 33 to a drive shaft 36 by a torque transfer pin 35 positioned inside the inner race of each of the ball bearings 34. The drive shaft 36 is enclosed by a drive shaft housing 37 which is bolted on the right and left side halves 4R and 4L of the gear case.

Referring now to FIG. 7, torque is carried from the drive shaft 36 to a clutch ring 38 by a torque transfer pin 35 installed inside the inner race of a clutch bearing 39 which centers the clutch ring 38 in a ratchet ring 42L on the left side and 42R on the right side. The bearing 39 is held captive on the clutch ring 38 by a snap ring 51. Referring to FIG. 8 as well as FIG. 7, two clutch dogs 40 are located in a "U" shaped channel in the clutch ring 38 with each mounted on a pin 41 with a flat head on the inboard end. The pins 41 are retained in the clutch ring by a washer installed between the clutch bearing 39 and the clutch ring 38. A hairpin spring holds the clutch dogs 40 in engagement with the ratchet ring 42.

A drive shaft housing closing plate 48 is bolted on the outboard end of the drive shaft housing 37 and mounts a wheel bearing 43 which supports an axial extension of the ratchet fitting 42L on the left side and 42R on the right side. A wheel hub 44 fits over a stud 45 and two pins 47 press fit in the end of the ratchet fitting extension. Each rear wheel hub is clamped on the extension of the ratchet fitting on that side by the nut 46. The drive shaft housing closing plate 48 extends upward to a point above the rear wheel where a standard commercially available side pull brake caliper (not shown) is bolted to it.

In the example design selected to illustrate the present invention, 20 pitch gears are used with a twenty degree pressure angle and a ½ inch face width. 48 teeth are used for the sprocket on the crank shaft and 12 teeth for the sprocket on the gear shaft. A standard bicycle chain with a ½ inch pitch is used to connect the sprockets. The gear shaft and the counter shaft are mounted with 2.500 inch separation between shaft centerlines so that the total number of teeth in the meshing gears is 100. The number of teeth in each of the four gears in the four gear cluster driven by the 12 tooth sprocket are, listing from smallest to largest, 40, 50, 55, and 60. Therefore the number of teeth in each of the meshing gears on the counter shaft are, listing from largest to smallest, 60, 50, 45, and 40. The counter shaft and the drive fitting are mounted with 2.750 inch separation between centerlines so that the number of teeth in the meshing gears is 110. The number of teeth selected for the gear driven by the counter shaft is 50. Therefore the number of teeth in the meshing gear on the drive fitting is 60. The resultant gear ratio (the number of turns of the rear wheels per turn of the crank shaft) and the equivalent diameter for 20 inch diameter driving wheels, are listed below.

| SPEED | RATIO | EQUIVALENT WHEEL DIAMETER |
|---|---|---|
| FIRST | 2.222 | 44.5 INCHES |
| SECOND | 3.333 | 66.6 |
| THIRD | 4.07 | 81.4 |
| FOURTH | 5.00 | 100 |

While this invention has been described in terms of a preferred embodiment, it is anticipated that persons skilled in mechanical design will, upon studying the drawings, realize many possible alterations and modifications. It is therefore intended that the following appended claims be interpreted as including all such modifications and alterations as fall within the true scope and spirit of the present invention.

I claim:

1. An improved ellipticycle including the front fork and head tube of a bicycle; two parallel lengths of bicycle tubing welded at their forward ends to said head tube and bolted at their aft ends to a cast aluminum gear case; a crank shaft rotatably mounted in the forward portion of said gear case with the ends of said crank shaft extending outboard of said gear case; a crank arm fixed on each outboard end of said crank shaft; a spindle fixed in the end of each of said crank arms; a pedal beam rotatably mounted on each of said spindles near the center of said pedal beam; a track roller bolted on each side of said gear case near the aft end of said gear case; a length of steel angle riveted along the inner side of each of said pedal beams near their aft ends; and an inboard facing leg of each of said steel angles located under each of said track rollers.

2. An improved ellipticycle according to claim 1 including a first sprocket fixed on said crank shaft inside said gear case; a gear shaft rotatably mounted parallel to said crank shaft in an aft portion of said gear case; a second sprocket fixed on a cluster of gears on said gear shaft; a bicycle chain coupling said first sprocket with said second sprocket; a counter shaft rotatably mounted in said gear case parallel to said gear shaft; multiple gears rotating freely on said counter shaft with each in constant mesh with one of said cluster of gears on said gear shaft; a means of locking any selected one of said freely rotating gears to said counter shaft; an output gear fixed on the end of said counter shaft; a drive fitting rotatably mounted parallel to said counter shaft in said gear case; a gear fixed on said drive fitting in constant mesh with said output gear on said counter shaft; and a drive shaft fixed in opposite ends of said drive fitting.

3. An improved ellipticycle according to claim 2 including a clutch ring fixed on the outboard end of said drive shaft; a drive shaft housing bolted on the outside of said gear case concentric with and enclosing said drive shaft; a drive shaft housing closing plate bolted on the end of said drive shaft housing; a ratchet fitting rotatably mounted concentric with said clutch ring with provisions for driving said ratchet fitting from said clutch ring; a cylindrical extension of said ratchet fitting extending out through a wheel bearing in said drive shaft housing closing plate; and provisions for fixing a wheel hub on the outboard end of said ratchet fitting.

4. An ellipticycle according to claim 2 wherein said means of locking any selected one of said freely rotating gears to said counter shaft includes: a tooth form inside the bore of each of said freely rotating gears; a pair of orthogonally oriented slots through said counter shaft; a bar sliding in each of said orthogonally oriented slots; a tooth form on the ends of each of said bars for engaging any selected one of said freely rotating gears; and a means for positioning said bars for engagement with any selected gear.

* * * * *